(12) United States Patent
Shimada et al.

(10) Patent No.: US 7,220,213 B2
(45) Date of Patent: May 22, 2007

(54) VEHICLE CONTROL APPARATUS (75) Inventors: Tetsuya Shimada, Kitakatsushika-gun (JP); Masahiro Iriyama, Yokohama (JP); Masami Murayama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 174 days.

(21) Appl. No.: 11/055,990

(22) Filed: Feb. 14, 2005

(65) Prior Publication Data
US 2005/0215396 A1 Sep. 29, 2005

(30) Foreign Application Priority Data
Mar. 25, 2004 (JP) .............................. 2004-089858

(51) Int. Cl.
F16H 59/74 (2006.01)
(52) U.S. Cl. ........................... 477/73; 477/101; 701/54
(58) Field of Classification Search ............... 477/101, 477/102, 107, 118, 109, 77, 73, 54
See application file for complete search history.

(56) References Cited

U.S. PATENT DOCUMENTS 5,265,498 A * 11/1993 Fodale et al. ............... 477/109
2004/0106497 A1 * 6/2004 Ayabe et al. ................ 477/107
2004/0112336 A1 * 6/2004 Badillo et al. ......... 123/406.51

FOREIGN PATENT DOCUMENTS

| JP | H05-321720 A | 12/1993 |
| JP | 2001-041065 A | 2/2001 |
| JP | 3374575 B2 | 11/2002 |

* cited by examiner

Primary Examiner—Charles A. Marmor
Assistant Examiner—Edwin A. Young
(74) Attorney, Agent, or Firm—Global IP Counselors, LLP (57) ABSTRACT A vehicle control apparatus is configured to avoid a forward lunging of a vehicle during a downshift while decelerating. The vehicle control apparatus has a clutch element that operatively coupled to an output of an engine to perform a gear shift operation and a controller that controls engine speed during shifts. If deceleration fuel cutoff conditions are met immediately after engine speed control accompanying a gear shift, delaying the start of fuel cutoff is prohibited and fuel cutoff is started right away whenever the deceleration operating conditions immediately prior to the start of engine speed control have been sustained for at least a specific length of time. On the other hand, if the deceleration duration is less than the specified time, the start of fuel cutoff is delayed so as to avoid catalyst overheating.

11 Claims, 7 Drawing Sheets

VEHICLE CONTROL APPARATUS

CROSS-REFERENCE TO RELATED APPLICATIONS

This application claims priority to Japanese Patent Application No. 2004-089858 filed on Mar. 25, 2004. The entire disclosure of Japanese Patent Application No. 2004-089858 is hereby incorporated herein by reference.

BACKGROUND OF THE INVENTION

1. Field of the Invention

The present invention generally relates to a vehicle control apparatus. The present invention relates to a vehicle control apparatus for temporarily disengaging a clutch during a gear shift and controlling the engine speed while the clutch is disengaged.

2. Background Information

Japanese Laid-Open Patent Application No. 2001-041065 discloses a vehicle equipped with a clutch for transmitting and disconnecting the output of an engine to a transmission, in which the clutch is temporarily disengaged during a gear shift, and the engine is controlled to an indicated speed while the clutch is disengaged.

Japanese Laid-Open Patent Application No. H05-321720 discloses a vehicle in which the start of deceleration fuel cutoff is delayed in order to prevent catalyst overheating that would otherwise be caused by deceleration fuel cutoff.

In view of the above, it will be apparent to those skilled in the art from this disclosure that there exists a need for an improved vehicle control apparatus. This invention addresses this need in the art as well as other needs, which will become apparent to those skilled in the art from this disclosure.

SUMMARY OF THE INVENTION

It has been discovered that with the conventional controls mentioned above, engine speed control is performed while the clutch is disengaged, and then clutch is engaged as soon as engine speed control is concluded. However, since these control systems do not control engine torque, the clutch may be engaged in a state in which engine torque is still high, which causes the vehicle to lunge forward and is discomforting to the driver. For example, if the throttle valve is opened so as to raise engine speed during a downshift while decelerating, then the clutch may be engaged in a state in which engine torque is still high. Moreover, if the start of fuel cutoff is delayed for the sake of the above-mentioned catalyst protection even though the deceleration fuel cutoff condition has been met when the clutch is engaged, engine torque comes into play during this delay period, causing the vehicle to lunge forward.

The present invention was conceived in light of the above problems. One object of the present invention is to provide a vehicle control apparatus which prevents the vehicle from lunging forward during clutch engagement (upon conclusion of engine speed control), which would be discomforting to the driver, even if engine speed control is performed during a downshift under deceleration.

In view of the foregoing, one aspect of the present invention is to provide a vehicle control apparatus that basically comprises a shift detecting section, a clutch element control section, an engine speed control section and a fuel cutoff control section.

The shift detecting section is configured to detect a shift being requested. The clutch element control section is configured to selectively operate a clutch element operatively coupled to an output of an engine to perform a gear shift operation. The engine speed control section is configured to selectively conduct engine speed control to adjust an engine speed to a target speed while the clutch element is selectively operated during the gear shift operation. The fuel cutoff control section is configured to selectively start deceleration fuel cutoff with a delay upon deceleration fuel cutoff conditions being met, the fuel cutoff control section further being configured to selectively prohibit the delay of the start of the deceleration fuel cutoff immediately after engine speed control based on an operating state.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
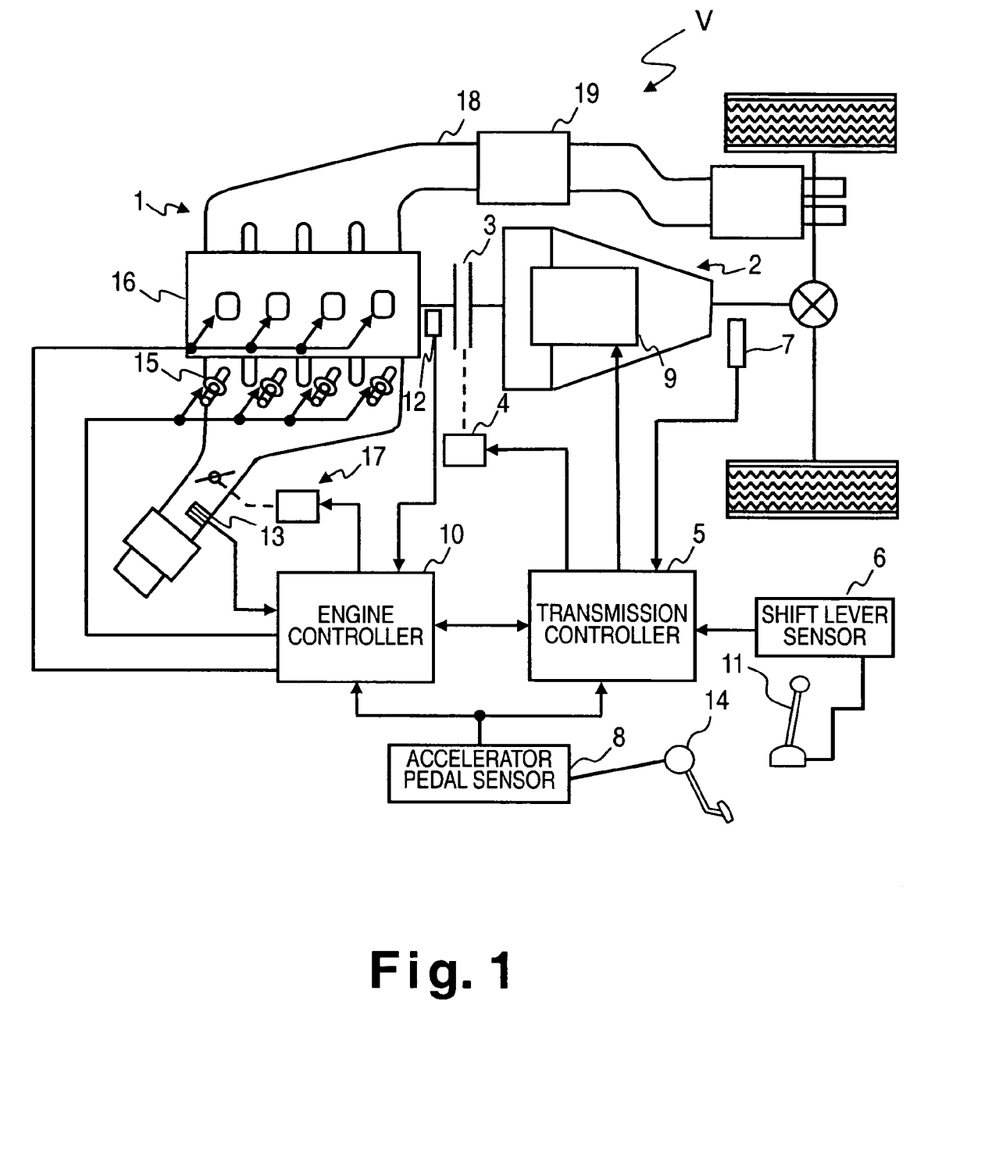
FIG. 1 is a simplified schematic block diagram of a vehicle equipped with a powertrain having a transmission that is controlled by a vehicle control apparatus in accordance with a preferred embodiment of the present invention.

Referring initially to FIG. 1, a vehicle V is schematically illustrated that is equipped with a powertrain and a vehicle control apparatus in accordance with a first embodiment of the present invention. The powertrain in this embodiment basically includes, among other things, an internal combustion (gasoline) engine 1 and a transmission 2 and a clutch element such as a friction clutch 3. The friction clutch 3 is disposed between the output shaft of the engine 1 and the input shaft of the transmission 2 to selectively engage and disengage the engine 1 from the transmission 2.

The vehicle control apparatus in this embodiment basically includes, among other things, a clutch actuator 4, a transmission controller 5, a shift lever sensor 6, a vehicle speed sensor 7, an accelerator pedal sensor 8, a shift actuator 9, an engine controller 10, an engine speed sensor 12, and an air flow meter 13. Basically, the vehicle control apparatus is configured to operate the friction clutch 3 for connecting and disconnecting the output of the engine 1 to the transmission 2 such that the friction clutch 3 is temporarily disengaged during a gear shift operation, the engine speed Ne is controlled to a target speed $Ne_t$ while the friction clutch 3 is disengaged, and the start of deceleration fuel cutoff in the engine 1 is delayed, with the delay of the start of deceleration fuel cutoff being prohibited immediately after engine speed control when certain conditions are met. With the vehicle control apparatus of the present invention, at the point when engine speed control accompanying a gear shift operation has been concluded, deceleration fuel cutoff is executed as soon as a deceleration fuel cutoff condition is met. Even though the lag in keeping up with changes in air quantity that accompanies engine speed control results in the amount of cylinder intake air being larger than the idle equivalent at the point when engine speed control is concluded, if fuel cutoff is executed right away, no engine torque will be generated. Thus, the vehicle control apparatus is configured to prevent the vehicle from lunging forward as soon as the engine speed control is concluded after a downshift gear shift operation.

In particular, the transmission controller 5 is configured to control the engagement and disengagement of the friction clutch 3 and the shifting of the transmission 2 in conjunction with the engine controller 10. The friction clutch 3 is switched between engaged and disengaged states by the transmission controller 5 actuating the clutch actuator 4. The transmission controller 5 includes, among other things, a microcomputer that is configured to receive input of gear selection signals from the shift lever sensor 6, vehicle speed (VSP) signals from the vehicle speed sensor 7, accelerator position (APO) sensor signals from the accelerator pedal sensor 8, and so forth.

When a gear shift is required by the vehicle driving conditions or the intentions of the driver (movement of a shifter 11), the transmission controller 5 disengages the friction clutch 3 by controlling the clutch actuator 4, and controls the shift actuator 9 while the friction clutch 3 is disengaged, thereby shifting to the required gear position.

Furthermore, in order to match the actual engine speed to the target engine speed, while the friction clutch 3 is disengaged, an engine speed control command is issued to the engine controller 10 (discussed below). When a signal is transmitted from the engine controller 10 indicating the conclusion of engine speed control (i.e., that the target engine speed has been matched), the clutch actuator 4 is controlled so as to engage the friction clutch 3 and conclude the shift operation.

The engine controller 10 includes among other things a microcomputer that is designed so as to be able to communicate with the transmission controller 5. Accelerator position sensor signals from the accelerator pedal sensor 8 of an accelerator pedal 14, engine speed signals from the engine speed sensor 12, intake air quantity signals from the air flow meter 13, and so forth are inputted to the engine controller 10.

The engine controller 10 controls fuel injection performed by a fuel injection valve 15, ignition timing performed by a timing device 16, and a throttle opening of an electric throttle 17 on the basis of the detection signals from the various sensors mentioned above and the engine speed control requests transmitted from the transmission controller 5.

While the transmission controller 5 and the engine controller 10 are illustrated as being separate components, these controllers can be composed of, for example, a single microcomputer (with one or more chips that realize functions of the present invention) having various timer functions, a CPU, ROM, RAM, digital ports, and A/D ports, as well as a high-speed communication circuit and other components. It will be apparent to those skilled in the art from this disclosure that the precise structure and algorithms for the transmission controller 5 and the engine controller 10 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 2:
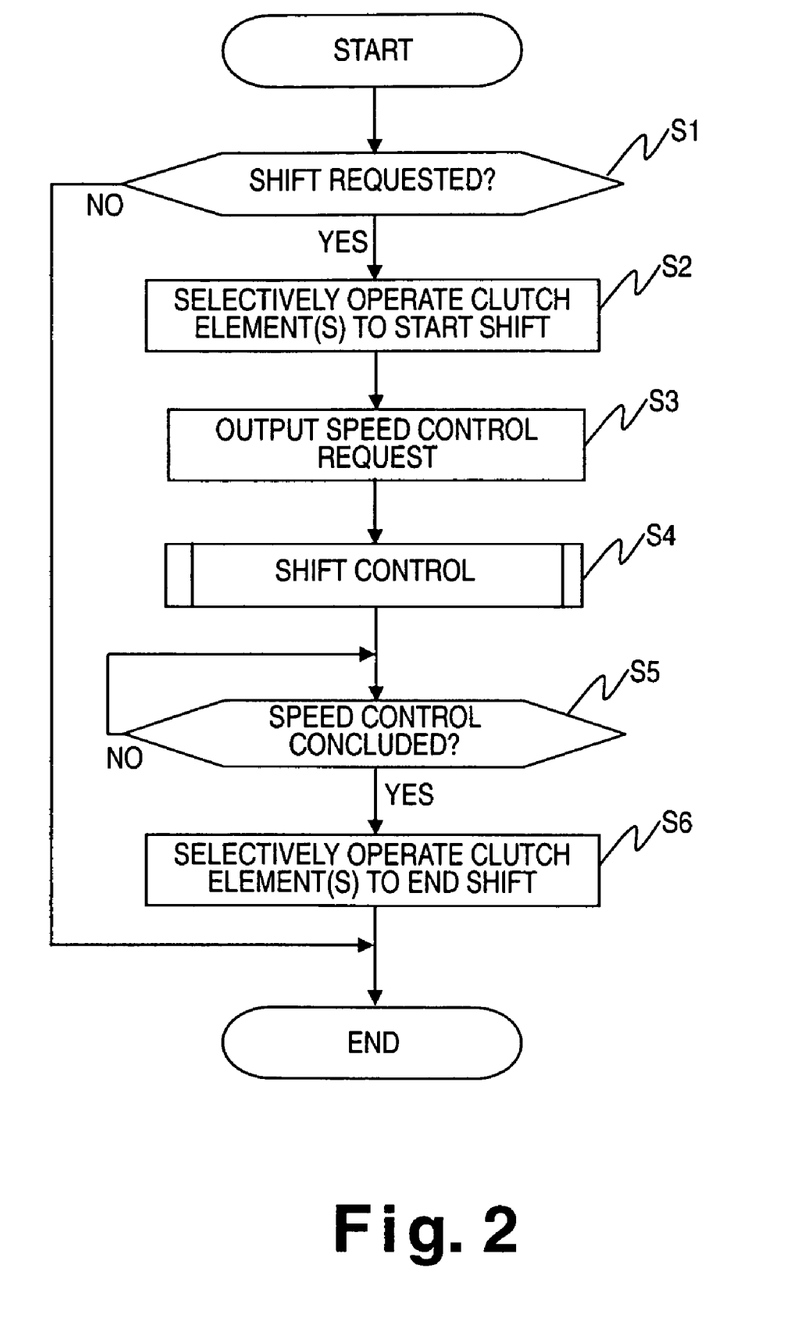
FIG. 2 is a flowchart explaining the shift control operations executed by the transmission controller 5 illustrated in FIG. 1 in accordance with the first embodiment of the present invention.

The shift control functions of the transmission controller 5 will now be described through reference to the flowchart in FIG. 2.

First, in step S1, the transmission controller 5 determines whether or not there is a shift request. In this embodiment, the processing of step S1 constitutes a shift detecting section that is configured to detect a shift being requested. If there is a shift request, that is, if the current gear is different from the gear required by vehicle operation conditions or the driver's intentions, the control routine proceeds to step S2.

In step S2, the transmission controller 5 selectively operates the friction clutch 3 such that the friction clutch 3 is disengaged in response to the detection of a shift request. Once the friction clutch 3 is disengaged, the control proceeds to step S3.

In step S3, an engine speed control request is outputted by the transmission controller 5 to the engine controller 10 to control the engine speed during the shifting by the transmission controller 5. In this embodiment, the processing of step S3 constitutes an engine speed control section that is configured to selectively conduct engine speed control to adjust an engine speed to a target speed while the clutch element (friction clutch 3) is selectively operated during the gear shift operation. The engine speed control operation is executed by the engine controller 10 in accordance with an engine speed control program as shown in the flow chart of FIG. 3 as discussed below.

In step S4, the shift actuator 9 is controlled so as to shift to the requested gear position as required by the vehicle operation conditions or the driver's intentions.

In step S5, the transmission controller 5 determines whether or not an engine speed control conclusion signal has been outputted from the engine controller 10. Once the transmission controller 5 determines that engine speed control conclusion signal has been outputted from the engine controller 10, the control moves to step S6.

In step S6, the transmission controller 5 selectively operates the friction clutch 3 such that the friction clutch 3 is engaged. Specifically, the transmission controller 5 outputs a signal to the clutch actuator 4 to engage the friction clutch 3, which concludes the shift control. In this embodiment, the processing of steps S2 and S6 constitute a clutch element control section that is configured to selectively operate a clutch element (the friction clutch 3) operatively coupled to an output of an engine to perform a gear shift operation.

Figure 3:
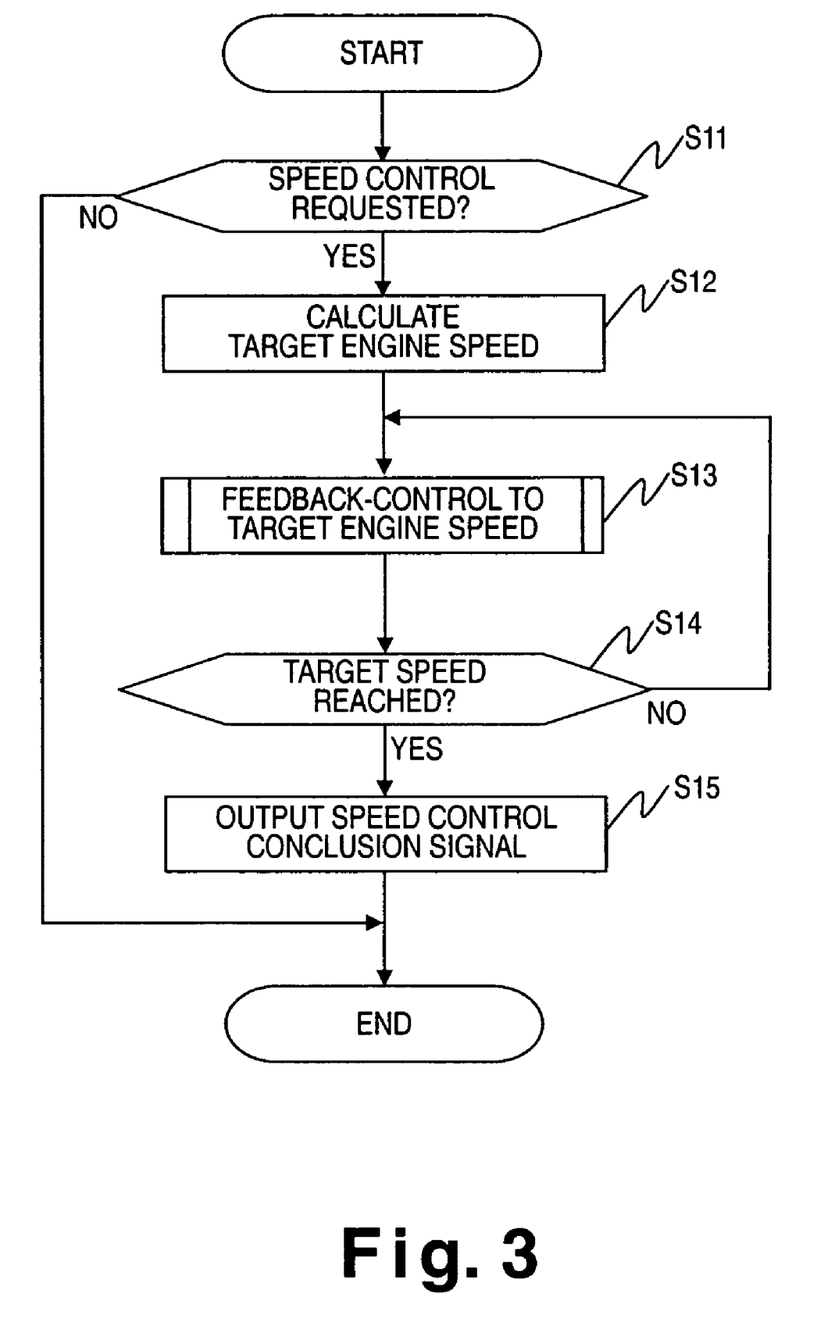
FIG. 3 is a flowchart explaining the engine speed control operations executed by the engine controller during a shift by the transmission controller 5 illustrated in FIG. 1 in accordance with the first embodiment of the present invention.
Figure 5:
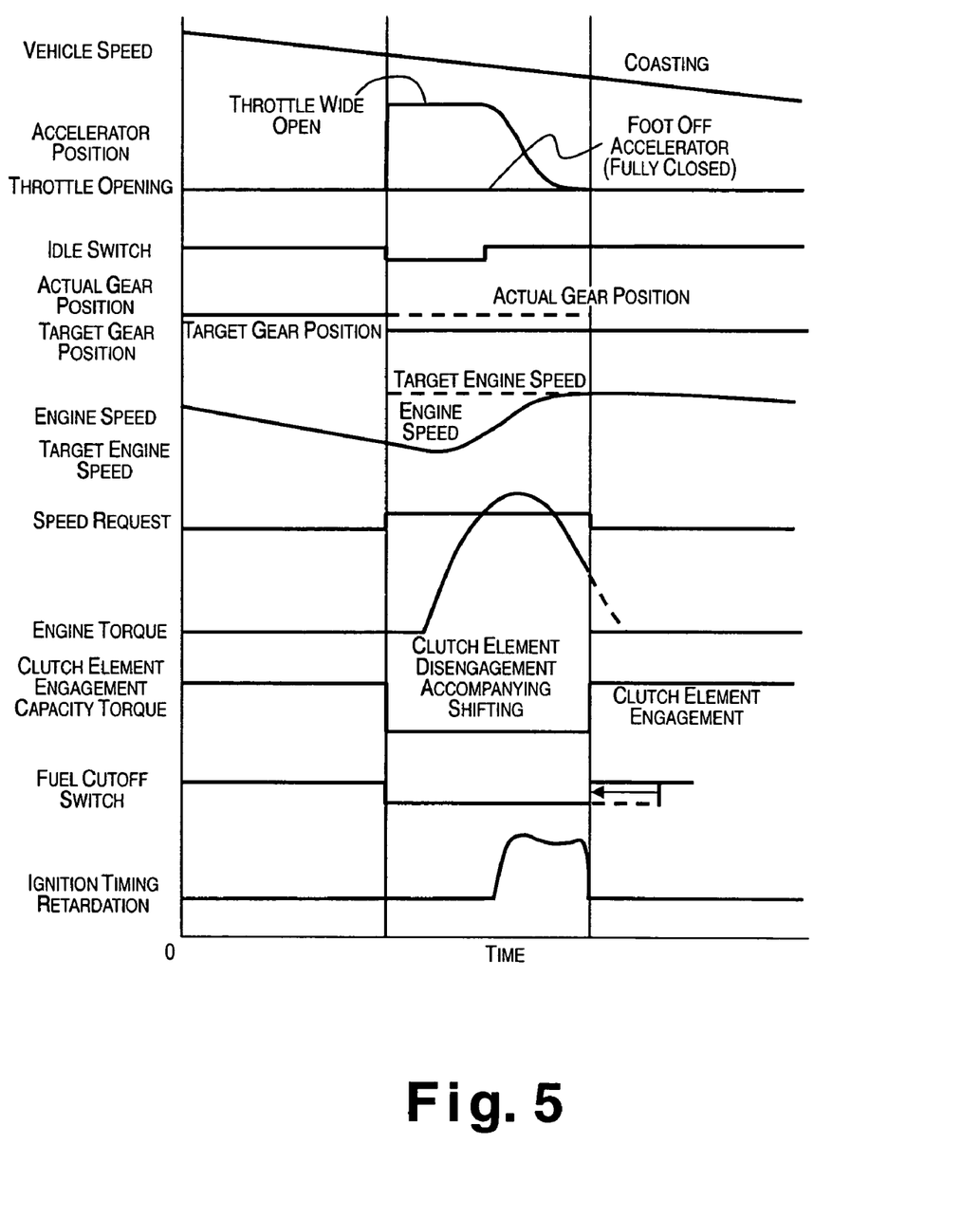
FIG. 5 is a time chart illustrating the control characteristics when delay of the start of deceleration fuel cutoff is prohibited in accordance with the first embodiment of the present invention.
Figure 6:
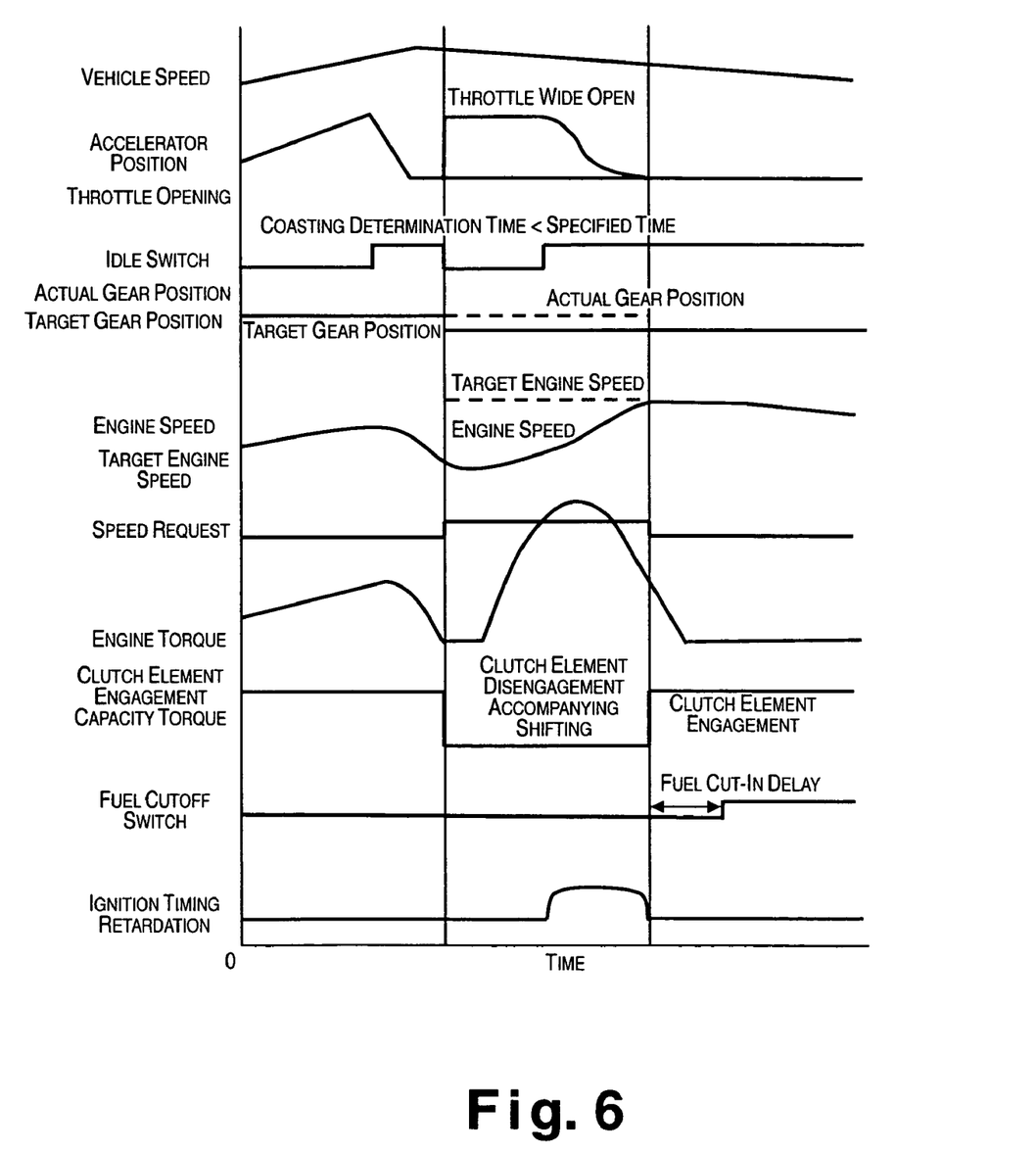
FIG. 6 is a time chart illustrating the control characteristics when the start of deceleration fuel cutoff is delayed in accordance with the first embodiment of the present invention.

The flowchart in FIG. 3 illustrates the engine speed control performed by the engine controller 10 when an engine speed control request has been transmitted from the transmission controller 5, while the time charts in FIGS. 5 and 6 show the changes in the various data in this engine speed control.

In step S11, the engine controller 10 determines whether or not an engine speed control request has been transmitted from the transmission controller 5. Once the engine controller 10 detects that an engine speed control request has been transmitted, the control routine proceeds to step S12.

In step S12, the target engine speed is calculated by the engine controller 10 on the basis of the gear position after shifting, the vehicle speed at that point, and so forth.

In step S13, the throttle opening of the electric throttle 17 is feedback-controlled by the engine controller 10 so as to match the actual engine speed at that point to the target engine speed. Here, the feedback control of the throttle opening is intended to retard the ignition timing so as to prevent overshooting of the engine speed as the target engine speed is approached. The system can be constituted such that the input shaft rotational speed of the transmission 2 is detected, and the throttle opening of the engine 1 is controlled so as to match the engine speed to the input shaft speed.

In step S14, the engine controller 10 determines whether or not the actual engine speed has come down to the target engine speed, and if it has, the control routine proceeds to step S15.

In step S15, the engine controller 10 outputs a signal indicating that engine speed control has concluded to the transmission controller 5. Upon receiving this engine speed control conclusion signal, the transmission controller 5 engages the disengaged friction clutch 3 (step S6 of FIG. 2), which concludes the shift operation.

Also, the engine controller 10 performs so-called deceleration fuel cutoff in which fuel injections by the fuel injection valves 15 are halted under deceleration operation conditions in which the throttle opening is fully closed and the engine speed is at or over a specific speed (except during the above-mentioned engine speed control). This deceleration fuel cutoff control is switched according to whether or not it is immediately after engine speed control accompanying a shift.

Figure 4:
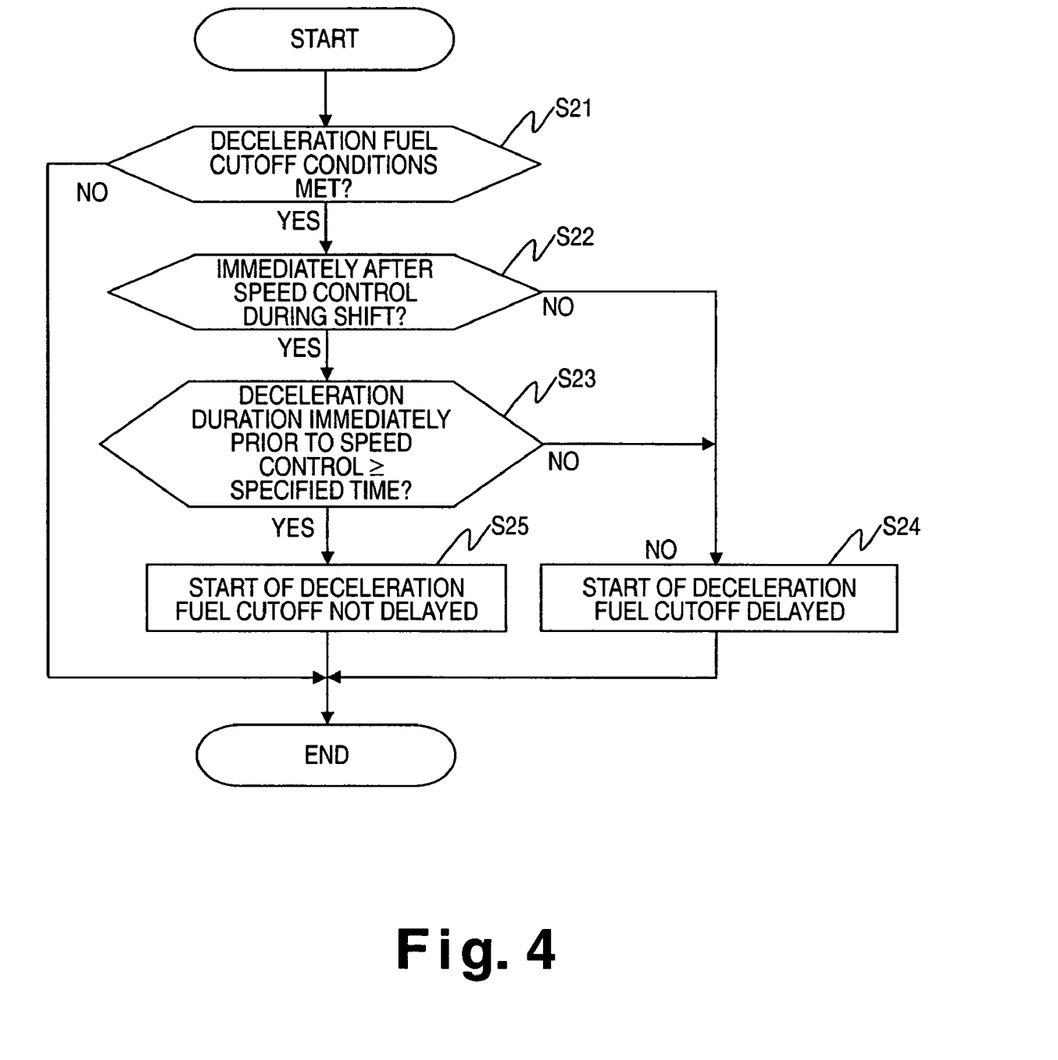
FIG. 4 is a flowchart explaining the deceleration fuel cutoff control operations executed during a shift by the transmission controller 5 illustrated in FIG. 1 in accordance with the first embodiment of the present invention.

The details of this deceleration fuel cutoff control will be described through reference to the flowchart in FIG. 4. In this embodiment, the flowchart in FIG. 4 constitutes a fuel cutoff control section that is configured to selectively start deceleration fuel cutoff with a delay upon deceleration fuel cutoff conditions being met, and that is configured to selectively prohibit the delay of the start of the deceleration fuel cutoff immediately after engine speed control based on an operating state.

In step S21, the engine controller 10 determines whether or not the conditions for executing deceleration fuel cutoff have been met. More specifically, the engine controller 10 determines if the conditions for executing deceleration fuel cutoff have been met under deceleration operating conditions in which the throttle opening is fully closed and the engine speed is at or over a specific speed, and engine speed control is not in progress (a shift is not in progress). When the engine controller 10 has been determined that the conditions for executing deceleration fuel cutoff have been met, the control routine proceeds to step S22.

In step S22, the engine controller 10 determines whether or not the current operating state is immediately after engine speed control. For example, even under deceleration operating conditions in which the throttle opening is fully closed and the engine speed is at or over a specific speed, if engine speed control is being performed (shift in progress), the engine torque is changed by supplying fuel according to the change in the amount of intake air allowed in by the electric throttle 17. Thus, the engine controller 10 controls the engine speed to the target level, and the deceleration fuel cutoff conditions are met at the point when this engine speed control has concluded.

In step S22, the engine controller 10 determines whether it is immediately after engine speed control, and if so, the control routine proceeds to step S23.

In step S23, the engine controller 10 determines whether or not the deceleration operating conditions immediately prior to the start of engine speed control have been sustained for at least a specific length of time (e.g., one second).

If the deceleration operating conditions immediately prior to the start of engine speed control have been sustained for at least a specific length of time (e.g., one second), it is determined that the temperature of a catalyst device or catalytic converter 19 installed along an exhaust pipe 18 of the engine 1 is not that high, but if this sustained duration is less than the specified time, it is determined that the temperature of the catalytic converter 19 is relatively high.

Meanwhile, in engine speed control during a downshift, the throttle 17 is opened and the engine speed raised, but sometimes a response lag in the amount of intake air with respect to throttle control causes the amount of intake air at the point of the conclusion of engine speed control to be greater than the idle equivalent, and in such cases the supply of fuel generates engine torque, causing the vehicle to lunge forward even though the vehicle is decelerating. Specifically, immediately after engine speed control, it is preferable to start deceleration fuel cutoff right away in an effort to prevent the vehicle from lunging forward. If deceleration fuel cutoff is started immediately after engine speed control (from the conclusion of the shift operation), then no engine torque will be generated even if there is a response lag in the amount of intake air, preventing the vehicle from lunging forward.

However, if the deceleration operating conditions immediately prior to the start of engine speed control have been sustained for less than the specified length of time (e.g., one second), and the temperature of the catalytic converter 19 is relative high, starting deceleration fuel cutoff right away can lead to overheating of the catalytic converter 19. In view of this, in this embodiment, in step S22, the engine controller 10 determines whether or not it is immediately after engine speed control, and if it is, the control routine proceeds to step S23. If the engine controller 10 determines in step S22 that the deceleration operating conditions immediately prior to the start of engine speed control have been sustained for less than the specified length of time (e.g., one second), then the control routine proceeds to step S24 and deceleration fuel cutoff is commenced after a delay of a specific time (see FIG. 6).

Specifically, when the control routine moves from step S23 to step S24, deceleration fuel cutoff is commenced after a specific delay time (e.g., one second) has elapsed since the conclusion of the engine speed control, which permits potential lunging of the vehicle forward and prevents overheating of the catalytic converter 19.

Meanwhile, if the engine controller 10 determines in step S23 that the deceleration operating conditions immediately prior to the start of engine speed control have been sustained for at least a specific length of time (e.g., one second), it is determined that there will be no overheating of the catalytic converter 19 even if the deceleration fuel cutoff is started right away, so the control routine proceeds to step S25 and the deceleration fuel cutoff is started immediately, without any delay time being provided, which prevents the vehicle from lunging forward (see FIG. 5).

Also, if the engine controller 10 determines in step S22 that it is not immediately after the engine speed control, there is no need to take into account that delaying the start of deceleration fuel cutoff will cause the vehicle to lunge forward, so the control routine proceeds to step S24 and the deceleration fuel cutoff is started after a delay of the specified time.

Further, in step S24, the start of deceleration fuel cutoff does not always have to be delayed. For instance, the start of deceleration fuel cutoff may be delayed only during deceleration from high-load operating conditions over a certain threshold. Thus, the delay period can be adjusted in step S24 form zero up to a prescribed value depending on the vehicle operating conditions.

Second Embodiment

Figure 7:
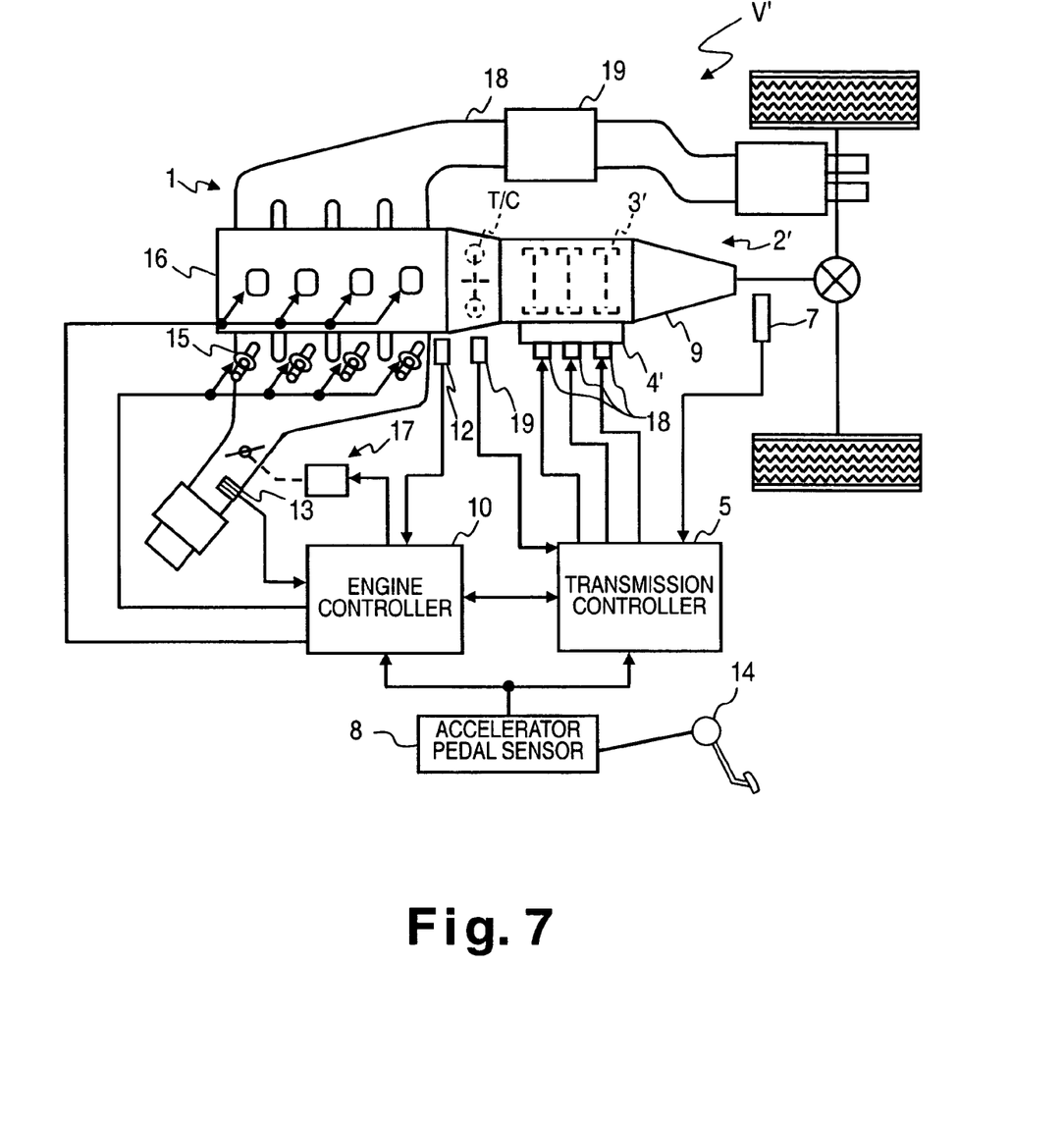
FIG. 7 is a simplified schematic block diagram of a vehicle equipped with a powertrain having an automatic transmission that is controlled by a vehicle control apparatus in accordance with a second embodiment of the present invention.

Referring now to FIG. 7, a simplified schematic block diagram of a vehicle V' equipped with a powertrain having an automatic transmission 2' that is controlled by a vehicle control apparatus in accordance with a second embodiment of the present invention. Basically, the vehicle V' of this second embodiment is identical to the first embodiment, except that the automatic transmission 2' of this second embodiment has been modified relative to the transmission 2 of the first embodiment and the programming of the transmission controller 5 and the engine controller 10 has been modified in view of the automatic transmission 2'. Thus, the shifter 11 has been eliminated form this embodiment. In view of the similarity between the first and second embodiments, the parts and/or processing used in the second embodiment that are identical to the parts and/or processing of the first embodiment will be given the same reference numerals as the parts and/or processing of the first embodiment. Moreover, the descriptions of the parts of the second embodiment that are identical to the parts and/or processing of the first embodiment may be omitted for the sake of brevity.

The automatic transmission 2' is a direct driven automatic transmission that is controlled by the transmission controller 5. The transmission controller 5 is configured to control the shift control functions of the transmission controller 5 using the flowchart in FIG. 2. The automatic transmission 2' directly controls hydraulic pressure being supplied to a plurality of hydraulic clutches and/or a plurality of hydraulic brakes that serve as gear changing friction elements 3' for determining the power transmission path (i.e., the combination of gear cogs used) of the transmission 2'. Accordingly, a control valve 4' is provided that serves to control the gear changing of the automatic transmission 2'. The control valve 4' has a plurality of hydraulic pressure duty solenoids 18 for controlling the selective holding (engagement and/or disengagement) of the friction (clutch) elements 3'. The number of hydraulic pressure duty solenoids 18 equal to the number of gear changing friction elements is provided on the control valve 4' that serves to control the gear changing of the automatic transmission 2'. These gear changing friction elements 3' are clutch elements that are configured and arranged to execute selective holding so as to determine a gear ratio of an automatic transmission 2'. Thus, the shift control functions of the transmission controller 5 carries out the steps of FIG. 2 with steps S2 and S3 detecting the status of the gear changing friction elements, e.g., detecting the status of the hydraulic pressure duty solenoids 18.

The hydraulic pressure duty solenoids 18 are configured to duty-control the hydraulic pressure of each respective friction element individually so as to selectively operate (connect and disconnect) the friction elements, thereby enabling prescribed power transmission paths of the automatic transmission 2' to be selected. The automatic transmission 2' thus delivers the engine power at a gear ratio corresponding to the selected power transmission path.

The drive duties of the duty solenoids 18 are determined by the transmission controller 5. As in the first embodiment, the engine controller 10 receives the accelerator position (APO) signal from the accelerator pedal sensor 8 and the engine speed (Ne) signal from the engine speed sensor 12. The accelerator position (APO) signal from and the engine speed (Ne) signal are transmitted from the engine controller 10 to the transmission controller 5. In this second embodiment, a signal from an input rotational speed sensor 19 that detects the input rotational speed Nt delivered to the automatic transmission 2' from a turbine of a torque converter T/C, and a signal from the vehicle speed (output rotational speed) sensor 7 that detects an output rotational speed No of the automatic transmission 2' that is indicative of the vehicle speed.

In step S4, the control valve 4' is controlled so as to shift to the requested gear position as required by the vehicle operation conditions or the driver's intentions.

The transmission controller 5 executes a well-known program (not shown in figures) based on the aforementioned input signals and controls the gear shifting of the automatic transmission 2' in the following fashion.

First, the accelerator position APO and a vehicle speed VSP computed based on the transmission output rotational speed No are used to find the gear best suited to the current operating conditions by referring to a gear change pattern schedule (not shown). If the best suited gear is the same as the currently selected gear, the transmission controller 5 determines that the gear will not be changed and does not issue a shift command or request. As a result, the drive duty of the duty solenoids 18 remains the same and the currently selected gear is maintained.

If the best suited gear is different from the currently selected gear, the transmission controller 5 issues a shift command and changes the drive duty of the corresponding duty solenoids 18 such that the gear changing friction (clutch) elements 3' are engaged or disengaged as required to change from the currently selected gear to the best suited gear. When a shift command or request is issued, the control routine of FIG. 2 that is executed by the transmission controller 5 proceeds to step S3 so that an engine speed control request is outputted by the transmission controller 5 to the engine controller 10 to control the engine speed during the shifting by the transmission controller 5. The engine speed control operation is executed by the engine controller 10 in accordance with the engine speed control routine as shown in the flow chart of FIG. 3 as discussed above.

In step S4, the control valve 4' is controlled so as to shift to the requested gear position as required by the vehicle operation conditions or the driver's intentions.

In step S5, the transmission controller 5 determines whether or not an engine speed control conclusion signal has been outputted from the engine controller 10. Once the transmission controller 5 determines that engine speed control conclusion signal has been outputted from the engine controller 10, the control moves to step S6.

In step S6, the transmission controller 5 outputs a signal to the control valve 4' execute selective holding (engagement and/or disengagement) of the friction (clutch) elements 3', which concludes the shift control.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle control apparatus comprising:
    a shift detecting section configured to detect a shift being requested;
    a clutch element control section configured to selectively operate a clutch element operatively coupled to an output of an engine to perform a gear shift operation;
    an engine speed control section configured to selectively conduct engine speed control to adjust an engine speed to a target speed while the clutch element is selectively operated during the gear shift operation; and
    a fuel cutoff control section configured to selectively start deceleration fuel cutoff with a delay upon deceleration fuel cutoff conditions being met, the fuel cutoff control section further being configured to selectively prohibit the delay of the start of the deceleration fuel cutoff immediately after completion of engine speed control based on an operating state.

2. The vehicle control apparatus according to claim 1, wherein
    the fuel cutoff control section is further configured to determine whether or not to prohibit the delay of the start of the deceleration fuel cutoff based on the operating state immediately prior to the start of engine speed control.

3. The vehicle control apparatus according to claim 2, wherein
    the fuel cutoff control section is further configured to prohibit the delay of the start of the deceleration fuel cutoff based on the operating state being a deceleration operation state immediately prior to the start of engine speed control that has been sustained for at least a specific length of time.

4. The vehicle control apparatus according to claim 1, wherein
    the clutch element is a clutch configured and arranged to connect and disconnect the output of the engine to and from a transmission.

5. The vehicle control apparatus according to claim 4, wherein
    the fuel cutoff control section is further configured to determine whether or not to prohibit the delay of the start of the deceleration fuel cutoff based on the operating state immediately prior to the start of engine speed control.

6. The vehicle control apparatus according to claim 5, wherein
    the fuel cutoff control section is further configured to prohibit the delay of the start of the deceleration fuel cutoff based on the operating state being a deceleration operation state immediately prior to the start of engine speed control that has been sustained for at least a specific length of time.

7. The vehicle control apparatus according to claim 1, wherein
    the clutch element is at least one friction elements configured and arranged to execute selective holding so as to determine a gear ratio of an automatic transmission.

8. The vehicle control apparatus according to claim 7, wherein
    the fuel cutoff control section is further configured to determine whether or not to prohibit the delay of the start of the deceleration fuel cutoff based on the operating state immediately prior to the start of engine speed control.

9. The vehicle control apparatus according to claim 8, wherein
    the fuel cutoff control section is further configured to prohibit the delay of the start of the deceleration fuel cutoff based on the operating state being a deceleration operation state immediately prior to the start of engine speed control that has been sustained for at least a specific length of time.

10. A vehicle control apparatus comprising:
    shift detecting means for detecting a shift being requested;
    clutch element control means for selectively operating a clutch element operatively coupled to an output of an engine to perform a gear shift operation;
    engine speed control means for selectively conducting engine speed control to adjust an engine speed to a target speed while the clutch element is operated during the gear shift operation; and fuel cutoff control means for selectively starting deceleration fuel cutoff with a delay upon deceleration fuel cutoff conditions being met, and for selectively prohibiting the delay of the start of the deceleration fuel cutoff immediately after completion of engine speed control based on an operating state.

11. A method of performing a vehicle control comprising:
detecting a shift being requested;
selectively operating a clutch element operatively coupled to an output of an engine to perform a gear shift operation;
conducting engine speed control to adjust an engine speed to a target speed while the clutch element is operated during the gear shift operation;
selectively start deceleration fuel cutoff with a delay upon deceleration fuel cutoff conditions being met; and
selectively prohibit the delay of the start of the deceleration fuel cutoff immediately after completion of engine speed control based on an operating state.

* * * * *